US008616717B2

United States Patent
Yun

(10) Patent No.: US 8,616,717 B2
(45) Date of Patent: Dec. 31, 2013

(54) ILLUMINATING APPARATUS WITH REDUCED GLARE

(75) Inventor: Hyeong-won Yun, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 160 days.

(21) Appl. No.: 13/227,145

(22) Filed: Sep. 7, 2011

(65) Prior Publication Data

US 2012/0127711 A1 May 24, 2012

(30) Foreign Application Priority Data

Nov. 24, 2010 (KR) .................. 10-2010-0117518

(51) Int. Cl.
G09F 13/04 (2006.01)
(52) U.S. Cl.
USPC .................... 362/97.1; 362/626; 362/97.3
(58) Field of Classification Search
USPC ................. 362/97.1, 331, 620, 626
See application file for complete search history.

(56) References Cited

U.S. PATENT DOCUMENTS

| 7,976,210 | B2* | 7/2011 | Shinozaki ............. 362/631 |
| 2004/0218390 | A1* | 11/2004 | Holman et al. ............. 362/245 |
| 2009/0086477 | A1 | 4/2009 | Noba et al. |
| 2010/0053959 | A1 | 3/2010 | Ijzerman et al. |

FOREIGN PATENT DOCUMENTS

| JP | 2009-157400 | 7/2009 |
| KR | 10-2006-0124068 A | 12/2006 |
| KR | 10-2010-0070610 A | 6/2010 |
| KR | 10-2010-0092856 A | 8/2010 |

OTHER PUBLICATIONS

Extended European Search Report issued in European Patent Application No. EP 11178217.3 dated Feb. 7, 2012.
H. Kim et al., "Geometrical analysis of optical transmission characteristics of prism sheet layers," Optical Engineering 44(12), 128001 (Dec. 2005).

* cited by examiner

Primary Examiner — Ali Alavi
(74) Attorney, Agent, or Firm — McDermott Will & Emery LLP

(57) ABSTRACT

An illuminating apparatus includes a light source unit including a plurality of LED packages, a first prism plate arranged on the plurality of LED packages and having a prism pattern formed thereon, and a second prism plate provided on the first prism plate, and arranged such that a lengthwise direction of a prism pattern formed on the second prism plate crosses a lengthwise direction of the prism pattern of the first prism plate. A triangular shape in a cross-section of the prism pattern of each of the first and second prism plates is an isosceles triangle, and a height H and a bottom side length L of the isosceles triangle satisfy the following conditions that $0.1L \leq H \leq 0.2L$.

17 Claims, 3 Drawing Sheets

ILLUMINATING APPARATUS WITH REDUCED GLARE

CROSS-REFERENCE TO RELATED APPLICATIONS

This application claims the benefit of Korean Patent Application No. 10-2010-0117518, filed on Nov. 24, 2010, in the Korean Intellectual Property Office, the disclosure of which is incorporated herein in its entirety by reference.

BACKGROUND

1. Field

The present disclosure relates to an illuminating apparatus with reduced glare.

2. Description of the Related Art

A Light emitting device (LED) is a semiconductor device that produces light of various colors by forming a light emitting source through a P-N junction of compound semiconductors. Recently, a blue LED and an ultraviolet LED formed using a nitride exhibiting superior physical and chemical characteristics have been introduced. Also, as a white light or other monochromatic light is created using a blue or ultraviolet LED and a fluorescent material, an application range of a LED increases.

The LED has long life span, may be made compact and light, and may be driven at a low voltage due to its strong directivity of light. Also, the LED is strong against shocks and vibrations, does not need preheat time and complicated driving process, and may be packaged in a variety of forms, and thus, the LED may be used for many purposes.

The LED is widely used as a general light source for illumination and an interest in comfort of illumination has increased. Factors affecting the comfort of illumination may include an illumination method, a type of a light source, intensity of illumination, brightness of a light source, and peripheral. The comfort of illumination is evaluated by a process of checking existence of glare based on the factors. Although it is difficult to quantify an amount of discomfort glare of various illuminating systems sensed by a human being, there are continuously been a demand to quantify discomfort glare to be used as a ground for objective determination. Recently, a unified glare rating (UGR) system suggested by the International Commission on Illumination (CIE) is used.

SUMMARY

Provided is an illuminating apparatus using an LED package that provides illumination with reduced glare.

Additional aspects will be set forth in part in the description which follows and, in part, will be apparent from the description, or may be learned by practice of the presented embodiments.

According to an aspect of the present disclosure, an illuminating apparatus includes a light source unit including a plurality of LED packages, a first prism plate arranged on the plurality of LED packages and having a prism pattern formed thereon, and a second prism plate provided on the first prism plate, and arranged such that a lengthwise direction of a prism pattern formed on the second prism plate crosses a lengthwise direction of the prism pattern of the first prism plate, wherein a triangular shape in a cross-section of the prism pattern of each of the first and second prism plates is an isosceles triangle, and a height H and a bottom side length L of the isosceles triangle satisfy the following conditions that $0.1L \leq H \leq 0.2L$.

The bottom side L may be equal to or less than 0.5 mm.

The light source unit may include a wiring substrate on which the plurality of LED packages are mounted, and a cover member that covers the wiring substrate and has a reflection surface reflecting light output from the plurality of LED packages in a direction toward the first prism plate.

At least one of the first and second prism plates may be formed of a light transmitting material containing a diffusion agent.

Both of UGR values according to two viewing directions that are perpendicular to each other may be equal to or less than 19. A directivity angle may be equal to or greater than 100°.

According to another aspect of the present disclosure, an illuminating apparatus includes a light source unit comprising a plurality of LED packages, an optical member arranged on the light source unit and changing distribution of light emitted from the light source unit, wherein a luminous intensity distribution curve of illumination light passing through the optical member is formed within a range of about −70° to about 70°.

The optical member includes a first prism plate, and a second prism plate provided on the first prism plate, and arranged such that a lengthwise direction of a prism pattern formed on the second prism plate crosses a lengthwise direction of the prism pattern of the first prism plate.

A directivity angle may be equal to or greater than 100°. Both of UGR values according to two viewing directions that are perpendicular to each other may be equal to or less than 19.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
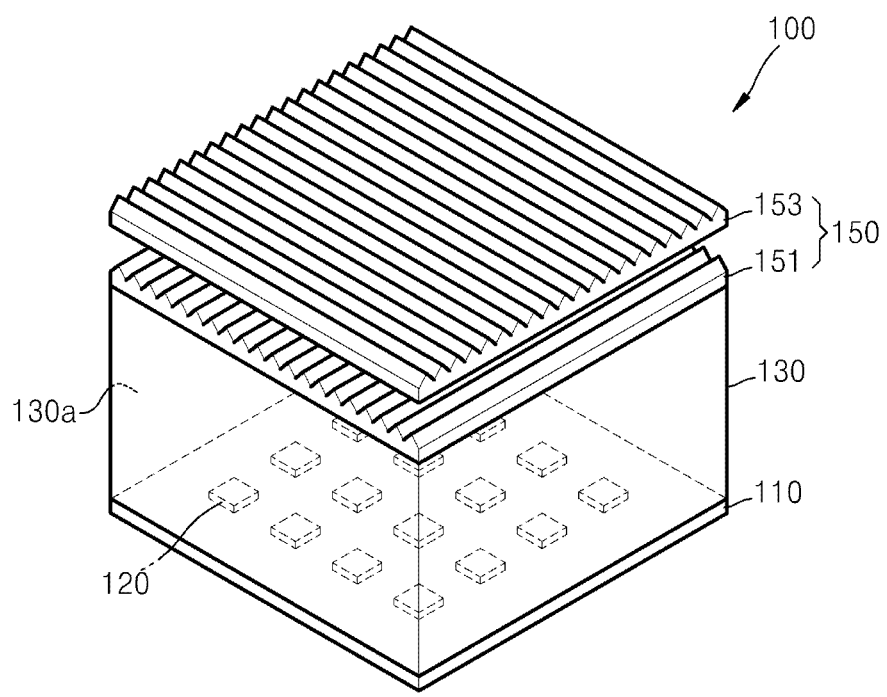
FIG. 1 schematically illustrates the structure of an illuminating apparatus according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
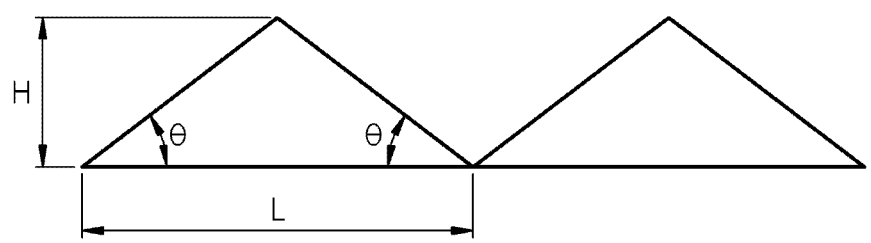
FIG. 2 illustrates variables related to the conditions of the shape of a prism pattern adopted in the illuminating apparatus of FIG. 1.

FIG. 1 schematically illustrates the structure of an illuminating apparatus 100 according to an embodiment of the present invention. FIG. 2 illustrates variables related to the conditions of the shape of a prism pattern adopted in the illuminating apparatus 100 of FIG. 1.

Referring to FIG. 1, the illuminating apparatus 100 includes a light source unit including a plurality of LED packages 120 and an optical member 150 arranged above the light source unit to change distribution of light emitted from the light source unit. The light source unit includes a wiring substrate 110 where the LED packages 120 are mounted and a cover member 130 covering the wiring substrate 110 and having a reflection surface 130a that reflects light output from the LED packages 120 in a direction toward the optical member 150.

Each of the LED packages 120 may be a light emitting diode chip having a P-N junction light emitting structure. The light emitting diode chip may emit light of a blue, green or red color according to a material of a compound semiconductor that forms a PN junction structure. Also, a structure of emitting a white light may be embodied by applying a fluorescent coating to a surface of a light emitting diode chip. The type, number, or shape of the LED packages 120 is not limited to the above descriptions.

The wiring substrate 110 is a place where the LED packages 120 are mounted and may further include a power supply unit (not shown) and a power control unit (not shown) for applying electric power to the LED packages 120.

The optical member 150 changes distribution of light output from the light source unit, for example, to have a suitable directive angle and an appropriate unified glare rating (UGR) value as a main illumination. The concept of UGR will be described later. The UGR value is related to a luminous intensity distribution curve formed by illuminating light. In the present embodiment, illumination light having a luminous intensity distribution curve that is deformed similar to a luminous intensity distribution curve of a parabolic illumination system, unlike an approximately circular luminous intensity distribution curve of a general Lambertian illumination system, is formed.

For example, the optical member 150 is configured to form a luminous intensity distribution curve of illumination light passing through the optical member 150 within a range of about −70° to about 70°. Also, the directive angle is adjusted to be equal to or more than about 100°. To this end, the optical member 150 includes a first prism plate 151 and a second prism plate 153. The first prism plate 151 and the second prism plate 153 are arranged such that prism pattern length directions thereof can be perpendicular to each other.

The first prism plate 151 and the second prism plate 153 are formed of a light transmitting material, for example, plastic or glass with a base of poly carbonate (PC), poly methyl methacrylate (PMMA), or acrylic. Also, any one or both of the first prism plate 151 and the second prism plate 153 may be selectively formed of a light transmitting material containing a diffusion agent.

The cross-section of a prism pattern may have an isosceles triangular shape as illustrated in FIG. 2. A height H and a bottom side length L of the prism pattern may satisfy the following conditions.

$$0.1L \leq H \leq 0.2L \quad \text{[Inequality 1]}$$

The size or cycle of a prism pattern may be appropriately determined. For example, the bottom side L may be equal to or less than about 0.5 mm.

The UGR is a standard for discomfort glare that is quantified to be used as a ground for objective determination. The International Commission on Illumination (CIE) provides the following standard for UGR.

TABLE 1

| Rating | UGR |
| --- | --- |
| Just intolerable | 31 |
| Uncomfortable | 28 |
| Just uncomfortable | 25 |
| Unacceptable | 22 |
| Just acceptable | 19 |
| Perceptible | 16 |
| Imperceptible | 10 |

Figure 3:
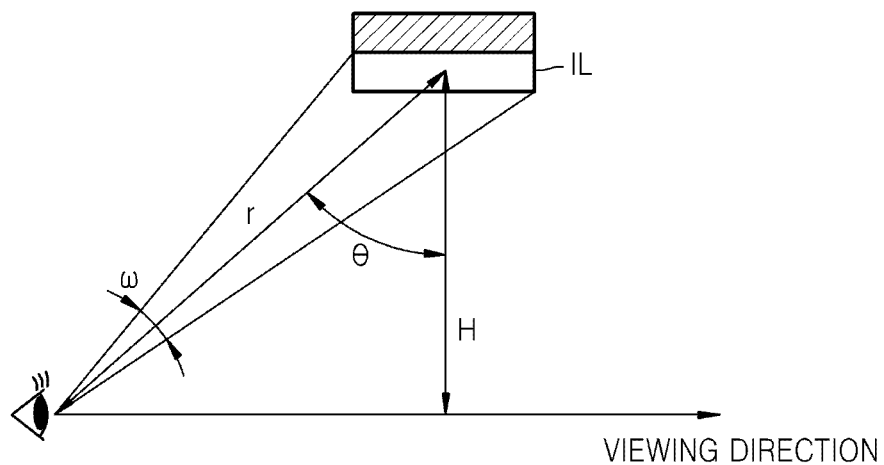
FIG. 3 is a conceptual diagram for explaining illumination factors related to the UGR evaluation.

In Table 1, illumination having a UGR value of 19 or less may be considered as a glare reduced illumination. FIG. 3 is a conceptual diagram for explaining illumination factors related to the UGR evaluation. The UGR is evaluated according to the following equations.

$$UGR = 8 \text{Log} \left[ \frac{0.25}{L_b} \sum \frac{L^2 \omega}{P^2} \right] \quad \text{[Equation 1]}$$

$$= 8 \text{Log} \left[ \frac{0.25}{L_b} \sum \frac{I^2(\theta) \cos^2(\theta)}{P^2 A H^2} \right]$$

$$L(\theta) = \frac{I(\theta)}{A \cos(\theta)}$$

$$\omega = \frac{A \cos(\theta)}{r^2} = \frac{A \cos^3(\theta)}{H^2}$$

$$H/r = \cos(\theta)$$

$$L_b = \frac{E_2}{\pi}$$

In Equation 1, "L(θ)" denotes the brightness of illumination IL (cd/m²), "I(θ)" denotes the luminous intensity of illumination IL (cd), "H" denotes the height of illumination IL (m), "A" denotes the area of illumination IL (m²), "$L_b$" denotes an average peripheral brightness (cd/m²), and "P" denotes a Guth position index (1~16).

In Equation 1, the UGR includes a log function with respect to an angle θ, that is, it can be said that a degree of contribution to the UGR is high in the case of a light source having a high directivity angle or a light source having a large amount of light at an angle θ that is high. Although it may be easy to decrease the directivity angle by reducing the UGR value, when an illuminating apparatus is to be used as a main illumination in a general indoor illumination, the directivity angle should be over about 100°. Thus, it may be a key to reduce the amount of light at an angle θ that is high.

In the present embodiment, the first prism plate 151 and the second prism plate 153 configured as illustrated in FIG. 1 are provided as an optical member satisfying the above-mentioned directivity angle and the UGR conditions. Also, the conditions of Inequality 1 are an optimal range set by considering the UGR and a light efficiency together. For example, in the range out of the condition, although the UGR is satisfactory, the light efficiency is deteriorated. The subject inventor computer-simulated the UGR and light efficiency with respect to an angle of about 22° at which the prism angle (θ of FIG. 2) is out of the condition of FIG. 1 and an angle of about 12.5° at which the prism angle (θ of FIG. 2) satisfies the condition of FIG. 1, and obtained the following results.

TABLE 2

| θ | 22° | 12.5° |
|---|---|---|
| Efficiency (%) | 79.4 | 85.7 |
| UGR | 12.0 | 14.5 |

Also, even when the condition range is satisfied, when the bottom side L or the height H increases, the luminous intensity distribution curve is not affected, but the light efficiency is deteriorated. An optimal bottom side L may be 0.5 mm or less.

Table 3 shows the UGR values evaluated by the above-described structure in comparison with a structure employing a general diffusion plate.

TABLE 3

| Item | Unit | Module | General Diffusion Plate | Embodiment 1 | Embodiment 2 | Embodiment 3 |
|---|---|---|---|---|---|---|
| Total Luminous Flux | lm | 963.6 | 849.8 | 856.2 | 845.3 | 828.6 |
| Optical Efficiency (Output/Source) | % | 100 | 88.19 | 88.85 | 87.72 | 85.99 |
| Maximum Luminous Intensity | Cd | 362.08 | 294.16 | 375.98 | 375.27 | 371.04 |
| Direct Luminance (@1 m) | Lx | 359.33 | 293.99 | 374.60 | 373.62 | 369.50 |
| Beam Angle | ° | 110 | 110 | 100 | 100 | 100 |
| Color Temperature | K | 4139 | 4077 | 4129 | 4132 | 4153 |
| CIE Chromaticity Diagram | — | 0.3767 | 0.3799 | 0.3774 | 0.3773 | 0.3762 |
|  | Δ |  | 0.0032 | 0.0007 | 0.0006 | −0.0005 |
|  |  | 0.3818 | 0.3856 | 0.3830 | 0.3830 | 0.3817 |
|  | Δ |  | 0.0038 | 0.0012 | 0.0012 | −0.0001 |
| CRI | — | 81.8 | 81.6 | 81.9 | 81.9 | 82.1 |
| UGR (by Relux) | Perpendicular |  | 20.7 | 16.2 | 16.0 | 16.1 |
|  | Parallel |  | 20.7 | 16.2 | 17.3 | 17.0 |

In Embodiments 1-3, the materials of the first and second prism plates 151 and 153 are different from each other. In Embodiment 1, the first prism plate 151 is formed of a light transmitting material containing a diffusion agent, whereas the second prism plate 153 is formed of a light transmitting material. In Embodiment 2, both of the first and second prism plates 151 and 153 are formed of a light transmitting material containing a diffusion agent. In Embodiment 3, the first prism plate 151 is formed of a light transmitting material, whereas the second prism plate 153 is formed of a light transmitting material containing a diffusion agent. In all embodiments 1-3, the height H and the bottom side L of the prism pattern are about 22 μm and about 200 μm, respectively.

The UGR shows values evaluated according to two viewing directions that are perpendicular to each other. Referring to Table 3, when the structures of the embodiments and a general diffusion plate are compared with each other, it can be seen that the UGR values according to the embodiments are remarkably improved to be low within a range in which difference in optical efficiency is not significant.

Figure 4:
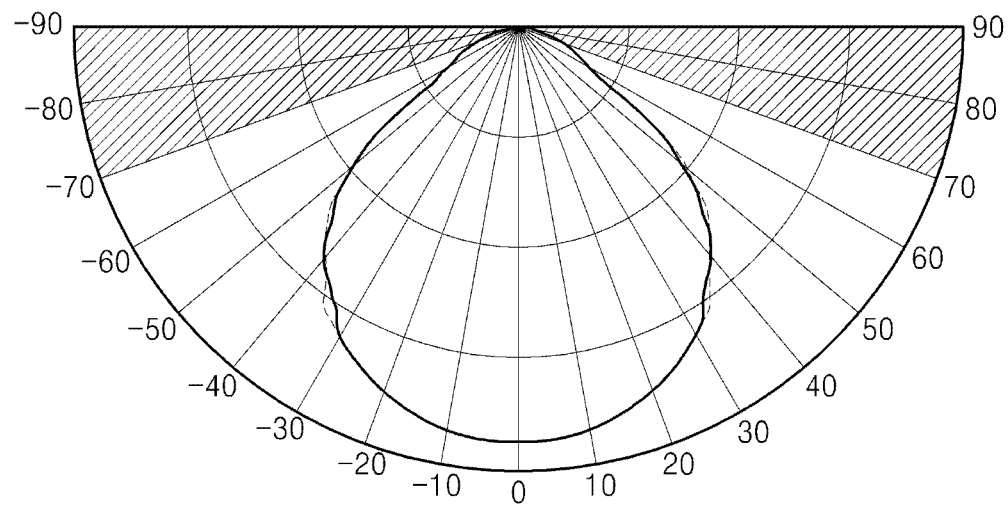
FIGS. 4-6 illustrate examples of luminous intensity distribution curves of illumination lights emitted by an illuminating apparatus according to various embodiments of the present invention.
Figure 5:
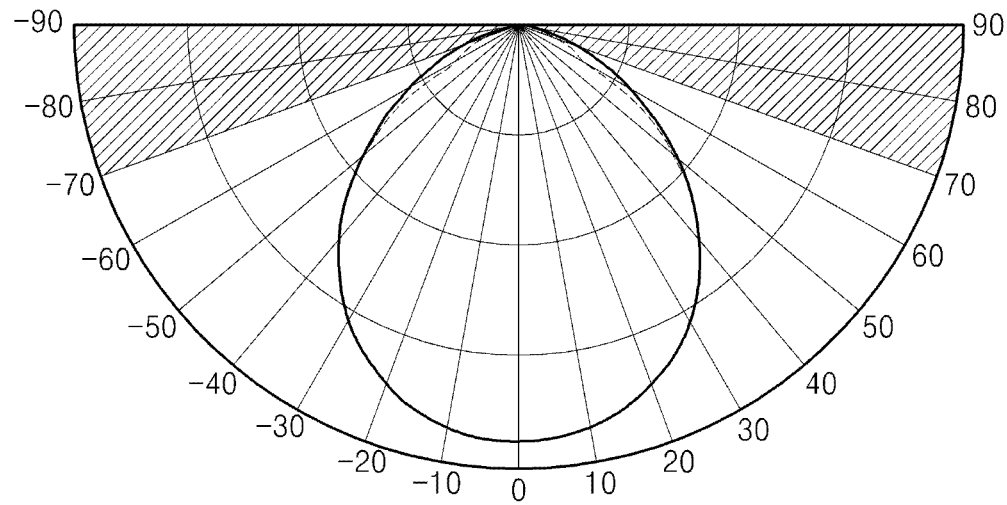
Figure 6:
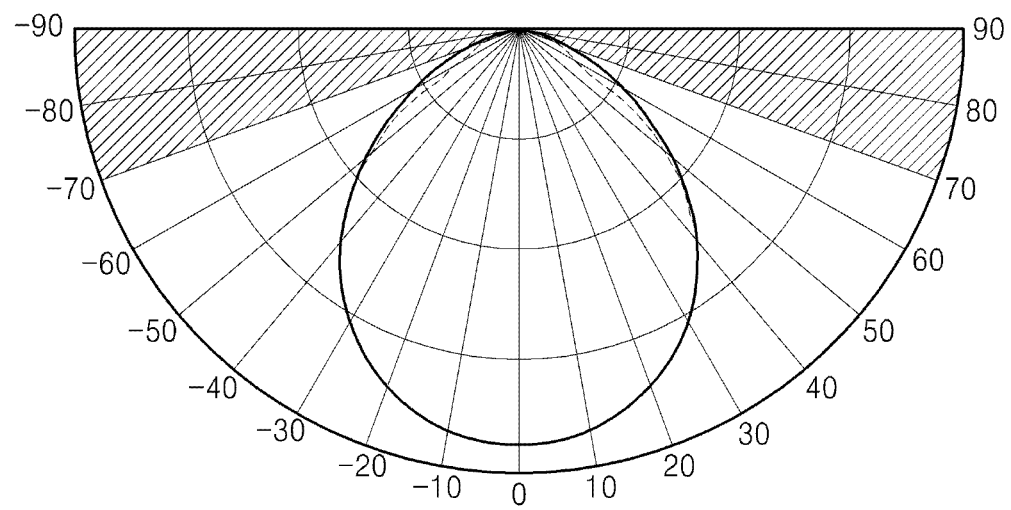

FIGS. 4-6 show examples of luminous intensity distribution curves of illumination lights emitted by an illuminating apparatus according to Embodiments 1, 2, and 3 of the present invention. The luminous intensity distribution curves are illustrated in two viewing directions that are perpendicular to each other. Referring to FIGS. 4-6, the luminous intensity distribution curves appear to be closer to luminous intensity distribution curves indicated by a parabolic illumination system than those of a Lambertian illumination system which are substantially circular. Also, all luminous intensity distribution curves are distributed within a range of about −70° to about 70° and have a directivity angle of about 100° or higher.

As described above, according to the one or more of the above embodiments of the present invention, the illumination apparatus 100 employs two units of prism plates that are perpendicularly arranged and optimizes a prism pattern shape, the illumination apparatus 100 has a directivity angle suitable for a main illumination and provides comfortable illumination with reduced glare.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An illuminating apparatus comprising:
   a light source unit comprising a plurality of LED packages;
   a first prism plate arranged on the plurality of LED packages and having a prism pattern formed thereon; and
   a second prism plate provided on the first prism plate, and arranged such that a lengthwise direction of a prism pattern formed on the second prism plate crosses a lengthwise direction of the prism pattern of the first prism plate,
   wherein a triangular shape in a cross-section of the prism pattern of each of the first and second prism plates is an isosceles triangle, and a height H and a bottom side length L of the isosceles triangle satisfy the following conditions that $0.1L \leq H \leq 0.2L$.

2. The illuminating apparatus of claim 1, wherein the bottom side L is equal to or less than 0.5 mm.

3. The illuminating apparatus of claim 1, wherein the light source unit comprises:
   a wiring substrate on which the plurality of LED packages are mounted; and
   a cover member that covers the wiring substrate and has a reflection surface reflecting light output from the plurality of LED packages in a direction toward the first prism plate.

4. The illuminating apparatus of claim 1, wherein at least one of the first and second prism plates is formed of a light transmitting material containing a diffusion agent.

5. The illuminating apparatus of claim 1, wherein both of UGR values according to two viewing directions that are perpendicular to each other are equal to or less than 19.

6. The illuminating apparatus of claim 5, wherein a directivity angle is equal to or greater than 100°.

7. An illuminating apparatus comprising:
  a light source unit comprising a plurality of LED packages; and
  an optical member arranged on the light source unit and changing distribution of light emitted from the light source unit,
  wherein a luminous intensity distribution curve of illumination light passing through the optical member is formed within a range of about −70° to about 70°, and
  wherein the optical member comprises a first prism plate including a prism pattern having an isosceles triangular shape in cross-section and a height H and a bottom side length L of the isosceles triangle satisfying $0.1L \leq H \leq 0.2L$.

8. The illuminating apparatus of claim 7, wherein a directivity angle is equal to or greater than 100°.

9. The illuminating apparatus of claim 7, wherein the optical member further comprises:
  a second prism plate provided on the first prism plate, and arranged such that a lengthwise direction of a prism pattern formed on the second prism plate crosses a lengthwise direction of the prism pattern of the first prism plate.

10. The illuminating apparatus of claim 9, wherein a triangular shape in a cross-section of the prism pattern of each of the first and second prism plates is an isosceles triangle.

11. The illuminating apparatus of claim 9, wherein at least one of the first and second prism plates is formed of a light transmitting material containing a diffusion agent.

12. The illuminating apparatus of claim 7, wherein the light source unit comprises:
  a wiring substrate on which the plurality of LED packages are mounted; and
  a cover member that covers the wiring substrate and has a reflection surface reflecting light output from the plurality of LED packages in a direction toward the first prism plate.

13. The illuminating apparatus of claim 7, wherein both of UGR values according to two viewing directions that are perpendicular to each other are equal to or less than 19.

14. The illuminating apparatus of claim 1, wherein the bottom side length L is equal to or less than 0.5 mm (L≤0.5 mm) and the height H is equal to or less than 0.1 mm (H≤0.1 mm).

15. The illuminating apparatus of claim 14, wherein the height H is approximately 22 μm and the bottom side length L is approximately 200 μm.

16. The illuminating apparatus of claim 7, wherein the bottom side length L is equal to or less than 0.5 mm (L≤0.5 mm) and the height H is equal to or less than 0.1 mm (H≤0.1 mm).

17. The illuminating apparatus of claim 16, wherein the height H is approximately 22 μm and the bottom side length L is approximately 200 μm.

* * * * *